(12) United States Patent
Blackburn

(10) Patent No.: US 7,178,828 B2
(45) Date of Patent: Feb. 20, 2007

(54) GAS GENERATOR

(75) Inventor: Jeffery S. Blackburn, Lake Orion, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 61 days.

(21) Appl. No.: 10/631,306

(22) Filed: Jul. 30, 2003

(65) Prior Publication Data

US 2004/0056461 A1  Mar. 25, 2004

Related U.S. Application Data

(60) Provisional application No. 60/399,596, filed on Jul. 30, 2002.

(51) Int. Cl.
*B60R 21/26* (2006.01)

(52) U.S. Cl. ...................... 280/736; 280/741

(58) Field of Classification Search ............. 280/741, 280/736; 102/530, 531; 403/348–350
See application file for complete search history.

(56) References Cited

U.S. PATENT DOCUMENTS

| 2,392,199 | A | * | 1/1946 | Steiger ..................... 244/98 |
| 3,375,656 | A | * | 4/1968 | Hawkins ................... 60/39.47 |
| 4,257,394 | A | * | 3/1981 | Zabel ...................... 126/374.1 |
| 4,296,084 | A |   | 10/1981 | Adams et al. |
| 4,590,041 | A | * | 5/1986 | Hill ........................... 422/165 |
| 5,062,367 | A | * | 11/1991 | Hayashi et al. ............. 102/530 |
| 5,445,406 | A | * | 8/1995 | Jones ........................ 280/728.2 |
| 5,454,587 | A | * | 10/1995 | Halford et al. ............. 280/728.1 |
| 5,525,306 | A | * | 6/1996 | Schmucker et al. ......... 422/165 |
| 5,753,852 | A | * | 5/1998 | Bernau et al. ............... 102/530 |
| 5,762,364 | A | * | 6/1998 | Cuevas ........................ 280/731 |
| 6,655,289 | B1 | * | 12/2003 | Bornheim et al. ....... 102/202.12 |

FOREIGN PATENT DOCUMENTS

DE  195 35 028 A1 *  3/1997
DE  196 02 696 A1 *  7/1997

* cited by examiner

*Primary Examiner*—Ruth Ilan
(74) *Attorney, Agent, or Firm*—L.C. Begin & Associates, PLLC.

(57) ABSTRACT

The present invention provides a gas generator (10) that includes a housing (12) formed from coupling a cap (14) and a base (16) in nested relationship. At least one attachment member (20) is preferably formed symmetrically about and integral to a peripheral flange (18) of the cap (14). The contour of a peripheral edge (60) formed from recessed and protruding portions provides interlocking communication between the cap (14) and the base (16). A plurality of hook members (36) is symmetrically formed about the peripheral edge (38) of the base (16). Each hook member (36) corresponds to a respective protruding portion (30) of the cap (14). An arcuate groove (40) is formed by an inner wall (42) of each respective hook member (36). The groove (40) is preferably tapered whereby the arcuate length of the groove or the inner wall (42) is greater at the first end (44) than at the second end (46). As a result, the base (16) when rotatably fixed to the cap (14) provides an interference fit at the hook/cap periphery interface.

5 Claims, 4 Drawing Sheets

GAS GENERATOR

CROSS REFERENCE TO RELATED APPLICATIONS

This application claims the benefit of provisional application Ser. No. 60/399,596 filed on Jul. 30, 2002.

BACKGROUND OF THE INVENTION

The present invention relates to gas generators, used to inflate air bags in a vehicle occupant protection system for example, and more particularly, to an improved structure that features a more efficient method of assembly.

Inflation systems for deploying an air bag in a motor vehicle generally employ a gas generator in fluid communication with an uninflated air bag. A firing circuit typically triggers the gas generator when the sensed vehicle acceleration exceeds a predetermined threshold value, as through the use of an acceleration-responsive inertial switch.

In many gas generator (or inflator) designs, the inflator is assembled by welding the housing to other components integrated therein. Precautions must be taken to ensure that the inflator housing is not excessively heated to prevent auto ignition of the gas generant contained within. Furthermore, the cost and complexity of welded designs is necessarily increased. A gas generator design not requiring a welded assembly would therefore be an improvement in the art.

SUMMARY OF THE INVENTION

The above referenced concerns are resolved by a gas generator that includes a housing formed from a base and a cap, wherein the cap is rotatably and/or adhesively fixed to the base. More specifically, the inflator includes a housing formed from a base and a cap, the cap further including a cap peripheral edge and the base further including a base peripheral edge, wherein the base peripheral edge is rotatably fixed about the cap peripheral edge upon assembly of the gas generator. A plurality of protruding portions are spaced along and integral with the cap peripheral edge wherein each of the plurality of protruding portions has a first radial length substantially equal to the radial lengths of the other protruding portions. A plurality of hook members is spaced about and integral with the base peripheral edge wherein each hook member corresponding to one of the plurality of protruding portions. Each of the plurality of hook members has a hook radial length substantially equal to the other hook members and the hook radial length is greater than the first radial length of the protruding portions.

Upon assembly of the gas generator, the cap is rotatably fixed to the base by slidably engaging each of said protruding portions within a corresponding hook member. Methods directed toward the assembly of the structure described above are also contemplated. Additionally, adhesive is preferably employed to fix the cap to the base and seal the gas generator.

DETAILED DESCRIPTION OF THE PREFERRED EMBODIMENT(S)

Figure 1:
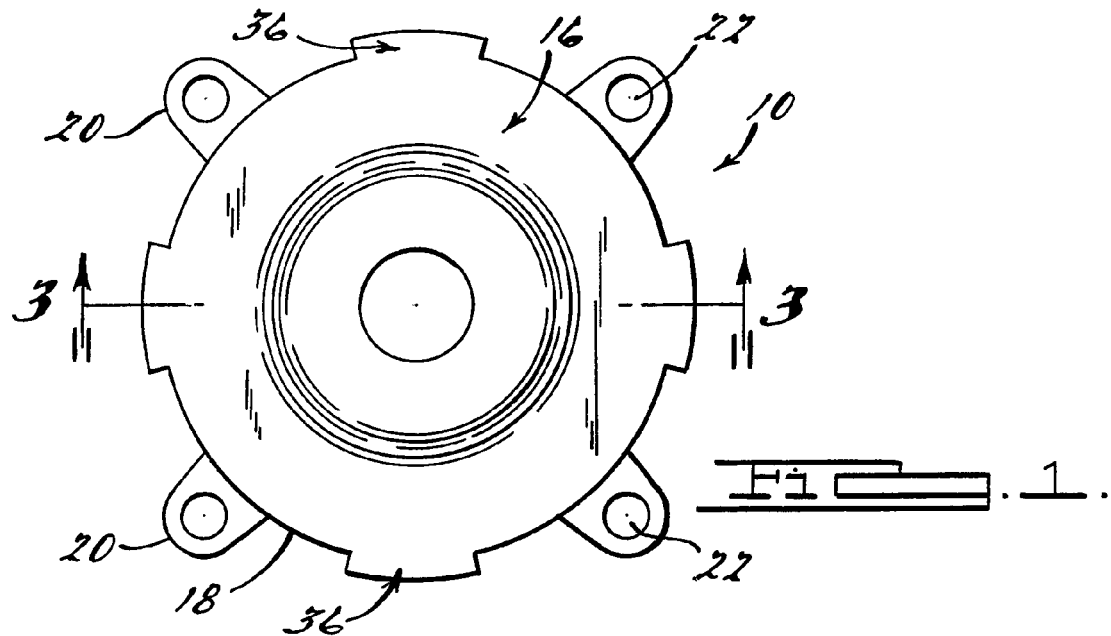
FIG. 1 is a top view of an inflator in accordance with the present invention.
Figure 2:
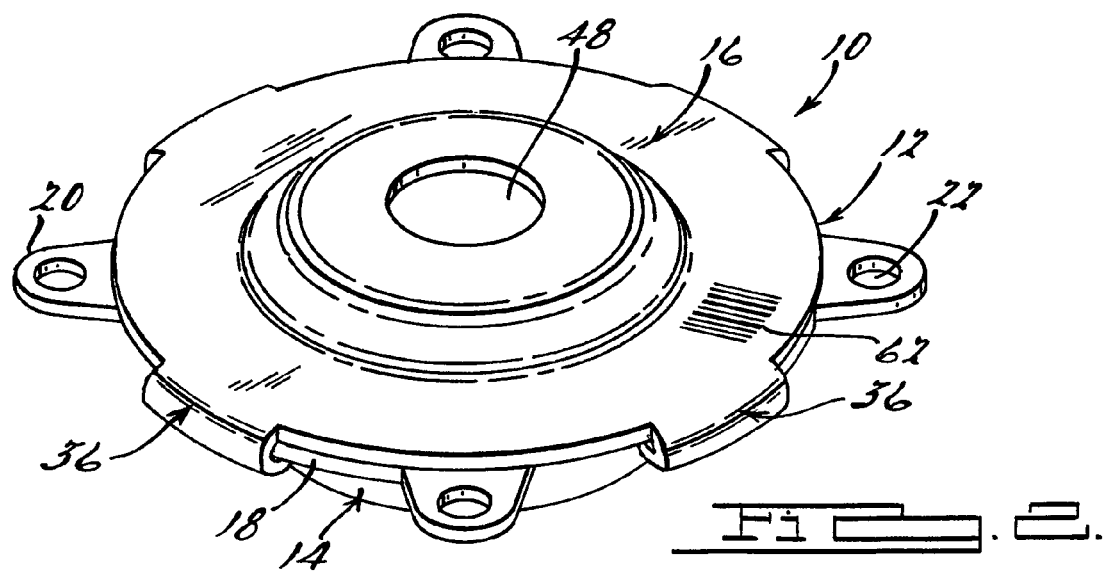
FIG. 2 is a perspective view of an inflator in accordance with the present invention.
Figure 3:
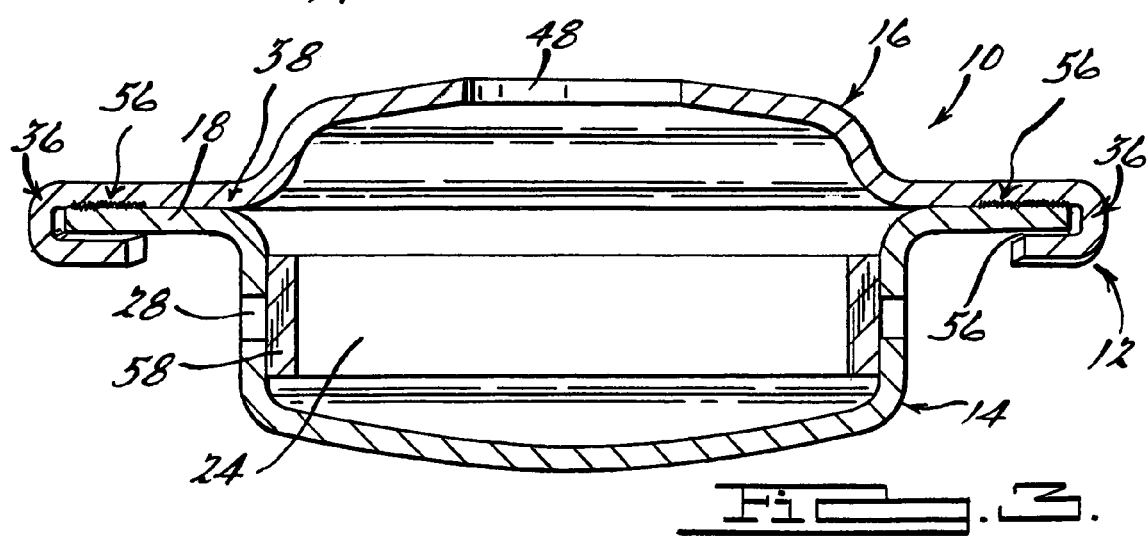
FIG. 3 is a cross sectional side view of the inflator of FIG. 4, in accordance with the present invention.
Figure 4:
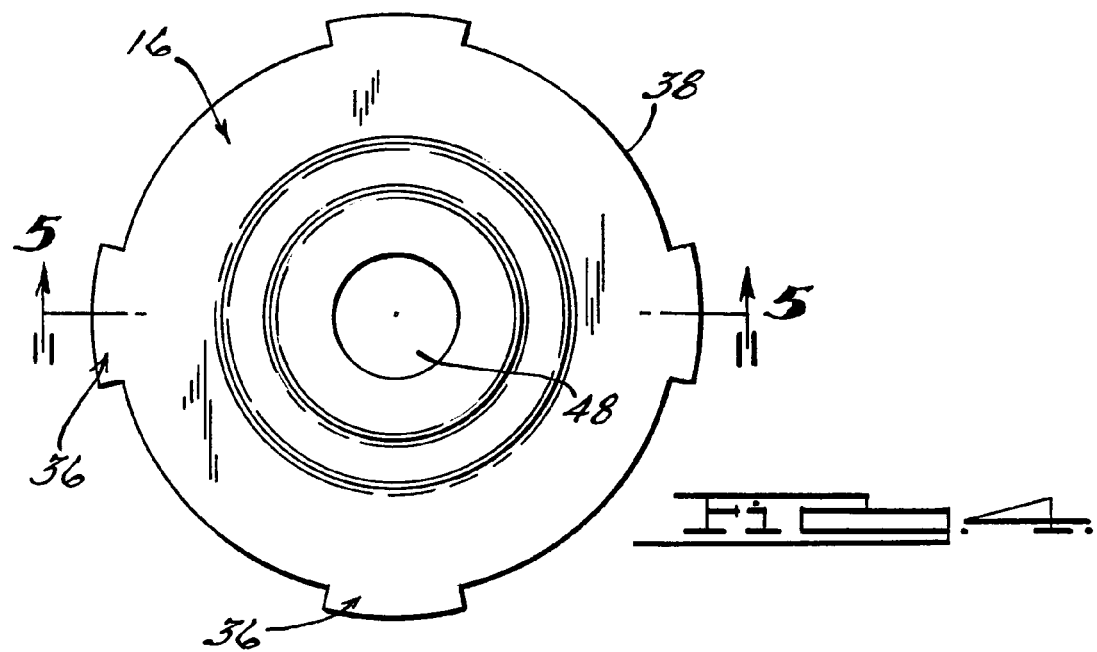
FIG. 4 is a top view of an inflator cap in accordance with the present invention.
Figure 5:
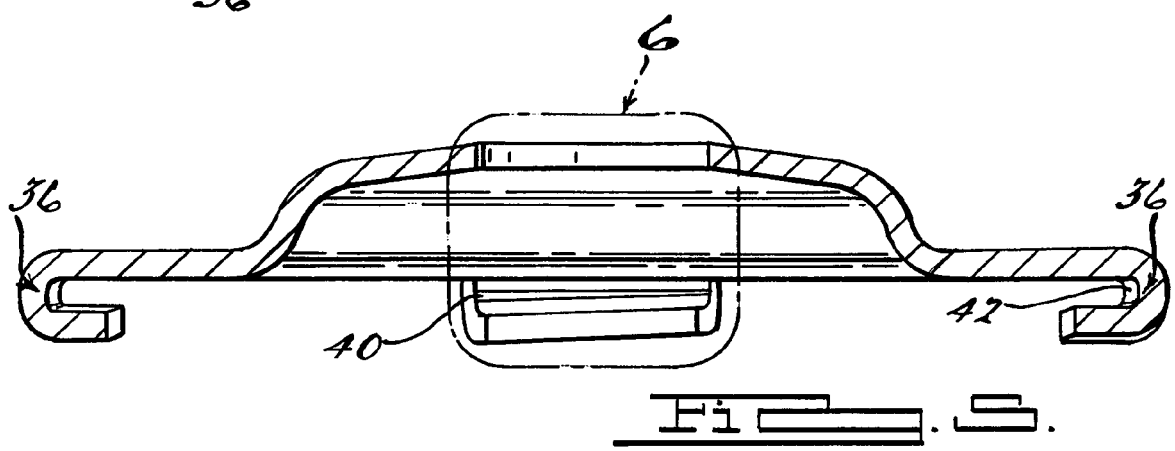
FIG. 5 is a cross-sectional side view of the inflator cap of FIG. 1, in accordance with the present invention.
Figure 6:
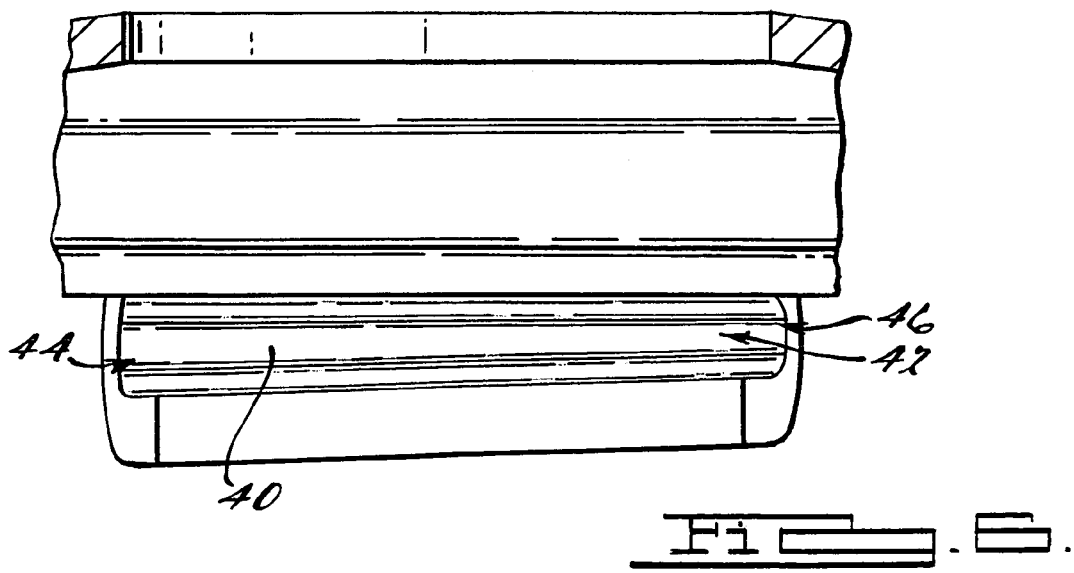
FIG. 6 is a view of the groove formed within the hook member.
Figure 7:
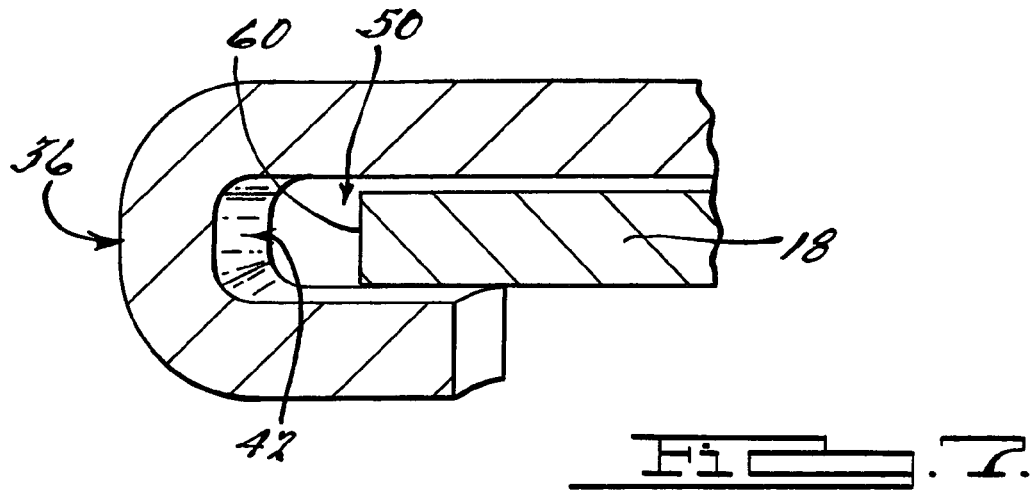
FIG. 7 is a view illustrating the interface between the hook members of the cap and the peripheral edge of the base.
Figure 8:
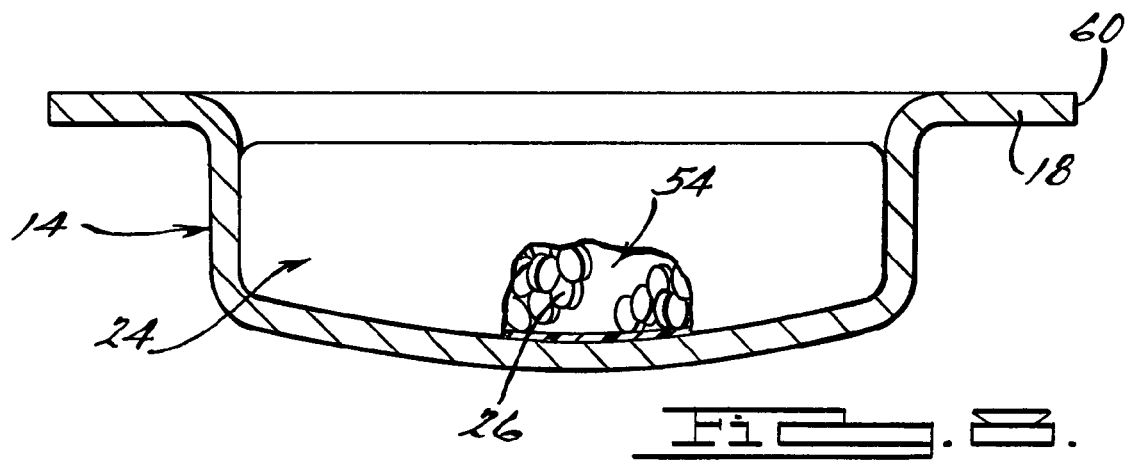
FIG. 8 illustrates Mylar® contained propellant within the inflator.
Figure 9:
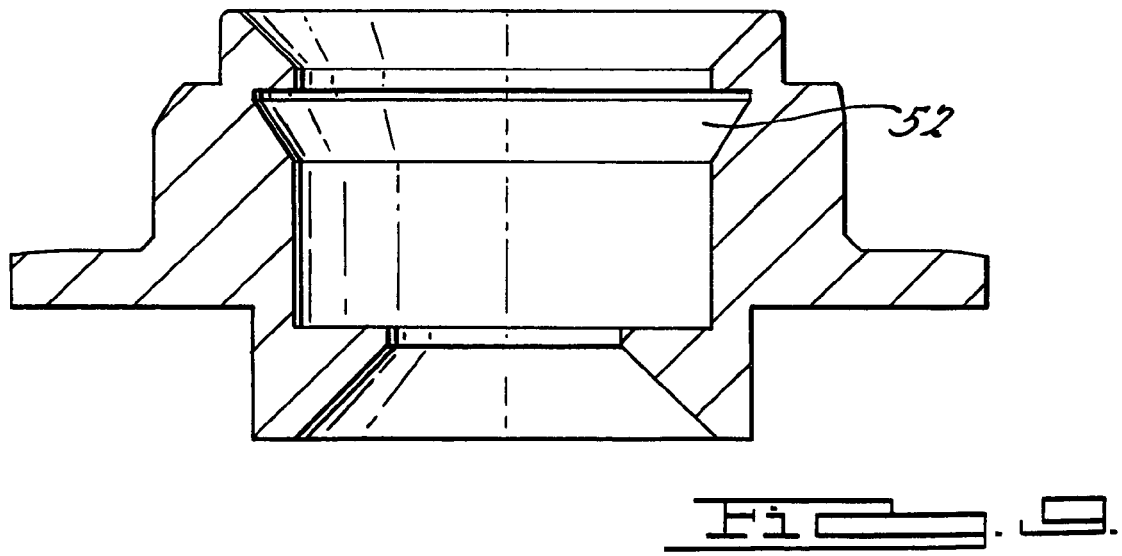
FIG. 9 illustrates an igniter in accordance with the present invention.
Figure 10:
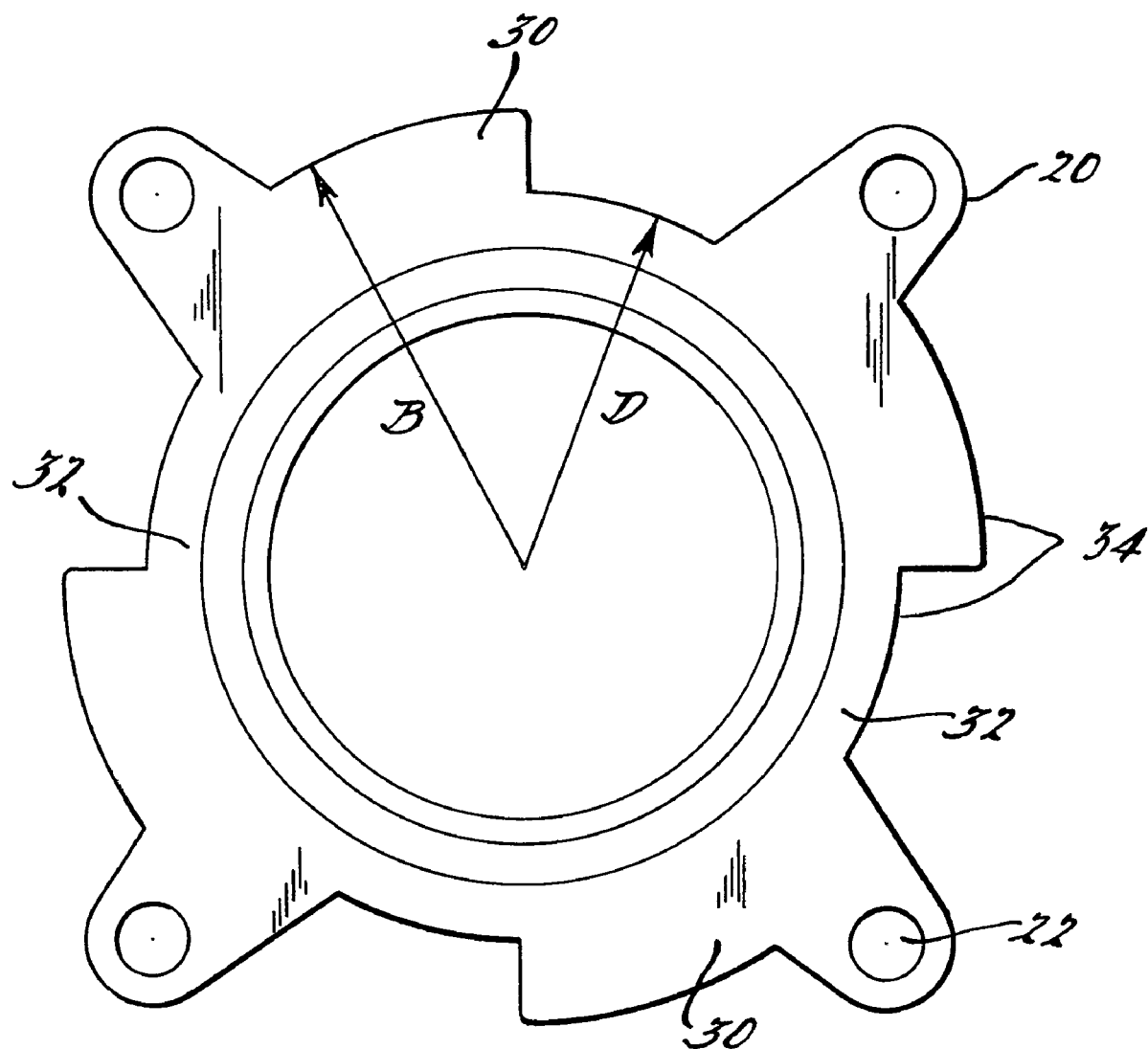
FIG. 10 illustrates an inflator base in accordance with the present invention.

In a vehicle occupant protection system, the present invention includes a gas generator 10 containing a housing 12 formed from rotatably coupling a cap 14 and a base 16 in nested relationship.

A peripheral flange 18 extends about the periphery of the cap 14 and provides a base for the functional features referenced below. At least one attachment member 20 and preferably a plurality of attachment members 20, are symmetrically formed about the cap 14 and integral to the flange 18. A bore 22 extends through each attachment member 20 for receipt of a male fastener (not shown) thereby facilitating attachment of the inflator 10 to the vehicle. As shown in the figures, a cup 24 is formed within and by the cap 14 for receipt of a gas generant 26. A plurality of gas exit apertures 28 are formed about the periphery of the cup 24.

As shown in the figures, one embodiment contains a plurality of protruding portions 30, each portion 30 also extending from the flange 18 and corresponding to an attachment member 20. Protruding portions 30 slidably engage with a plurality of base hook members described below, thereby rotatably fixing the cap 14 to the base 16. The radial length "B" of each protruding portion 30 is equal to or at least substantially equal to the radial lengths of the other protruding portions 30. As described below, the contour of peripheral edge 34, formed from the recessed and protruding portions respectively, facilitates interlocking communication between the cap 14 and the base 16.

A plurality of recessed portions 32 also extends from the flange 18, and facilitates circumferential alignment or orientation of the cap 14 with the base 16 prior to rotatably fixing the cap and base, wherein each recessed portion 32 is juxtaposed to a corresponding protruding portion 30. The radial length "D" of each recessed portion 30 is equal or at least substantially equal to the radial lengths of the other recessed portions 30, but less than the radial length "B" of the protruding portions 30.

A plurality of hook members 36 are symmetrically formed about a peripheral edge 38 of the base 16, thereby facilitating attachment of the base 16 to the cap 14. An arcuate groove 40 is formed by an inner wall 42 of each respective hook member 36. As shown in the figures, the base 16 preferably contains four base hook members 36, each hook member 36 corresponding to a respective protruding portion 30. Each hook member 36 has a first arcuate end 44 and a second arcuate end 46. The groove 40 is preferably tapered whereby the arcuate length of the groove 40 or the inner wall 42 is greater at the first end 44 then at the second end 46. As a result, the base 16 when rotatably fixed to the cap 14 provides an interference fit at the hook/cap periphery interface. Other attachment methods, such as a ball and socket for example, are also contemplated. An annular wall or annulus 48 is centrally and radially disposed within the base 16. The tapered gap 50 formed by the arcuate groove 40 will preferably range from one to ten thousandths of an inch, thereby ensuring the integrity of an associated adhesive seal when the housing 12 is pressurized.

An igniter 52 is press fit within the annulus 48 whereby the igniter when actuated ignites the gas generant 26. As known in the art, the igniter 52 electrically or mechanically communicates with a crash sensor of a vehicle occupant protection system (not shown). Upon a crash event, an electric signal generated by computer algorithm or otherwise is sent to the igniter 52, thereby initiating combustion of propellant 26, and inflation of an air bag (not shown) in fluid communication with the inflator 10.

The propellant or gas generant 26 is preferably sealed within a Mylar® bag 54 thereby sealing the propellant 26 from humidity and the ambient climate. In accordance with the present invention, hermetically sealing the gas generant 26 within the plastic or polyester film reduces the need to provide enhanced sealing of the gas generator 10 at the cap 14/base 16 interface and at other areas of the inflator 10. Polyester or plastic films forming the bags can be purchased from Dupont and are generally known as Mylar®, under the product name of Mylar® 350 SBL 300, for example. Other suitable films may also be employed, but should have properties similar to the Mylar® described above.

The cap 14 and the base 16 may be stamped, die cast, or otherwise formed by methods known in the art. The cap 14 and the base 16 are preferably formed from carbon steel, aluminum, or other materials as known in the art. The cap 14 and the base 16 may be obtained from companies such as Globe Tool of Minneapolis, Minn. for example. The propellant 26 may be any gas generant known to be useful in the art. Preferable gas generant compositions may be in pelletized form and include but are not limited by those described in co-owned U.S. Pat. Nos. 5,035,757; 5,872,329 and 6,210,505 the teachings of which are herein incorporated by reference. The igniter 52 may be formed and supplied by methods and manufacturers known in the art.

In further accordance with the present invention, the cap 14 and the base 16 are adhesively connected along the flange 18 and the peripheral edge 38. By adhesively connecting the two members of the housing 12, other typical connection means such as welding or crimping may be avoided unless also desired. Although a preferred embodiment includes the fastening means defined herein, including the protruding portions 30 and the base hook members 36, it is contemplated that adhesives used in conjunction with the present invention can if desired reduce the complexity of the fastening means whereby the adhesive described below constitutes most if not all of the fastening means. The manufacturing costs are thereby reduced given the enhanced simplicity of construction of the inflator 10. In the same way, the igniter 52 may also be adhesively connected to the annulus 48 whereby typical crimping or welding is not required.

When assembling the components of the inflator 10, adhesive must first be applied to the part interfaces. In accordance with the present invention, an adhesive 56 preferably has a decomposition temperature of about 110°–120° C. More generally, the decomposition temperature of the glue 56 is preferably below the auto ignition temperature of the gas generant 26 (at about 150° C. for example). Providing the glue 56 having a lower decomposition temperature than the auto ignition temperature facilitates venting of the inflator 10, should the propellant 26 auto ignite at slightly higher relative temperatures. Stated another way, as the ambient temperature increases the seal provided by the glue at various part interfaces decomposes prior to auto ignition of the propellant 26 thereby preventing any inadvertent rupture of the inflator 10. Overall system safely is thereby enhanced.

Exemplary adhesives, generally two-part epoxies, are provided by Vantico, Inc of East Lansing, Mich. under the trade names of ARALDIT® AW-8595/HARDENER® HW-8595, EPIBOND® 1590-A/B, and ARADALITE® 2014. Other exemplary adhesives include those provided by 3M of Minneapolis, Minn. under the trade names of 2214 Regular, 2214 Hi-Dense, 2214 Hi-Flex, 2214 Hi-Temp, 2214 Non-Metallic Filled, DP 460 Off-White and DP 420 Off-White. The adhesives should be applied and used in accordance with manufacturer instructions and recommendations.

To assemble the inflator 10, the propellant 26 is hermetically sealed within the Mylar® pouch 54 and then inserted into the cap 14. A known woven wire annular mesh 58 may be inserted within the cap 14 to provide gas filtration. Glue 56 is applied to the cap/base interface formed at the flange 18 peripheral edge 38 interface, or, applied between the cap flange 18 and the base peripheral edge 38. Stated another way, a cap peripheral edge 60 is adhesively mated to a base peripheral edge 38 once the cap 14 is rotatably fixed to the base 1 6.

After applying adhesive 56, hook members 36 are mated with recessed portions 32 in overlying relation thereto. Hook members 36 then slidably engage flange 18 as base 16 is rotated counterclockwise relative to cap 14. As shown in the figures therefore, the radial length determined from the center of annulus 48 to the inner groove 40 must be slightly larger than the radial length B determined from the axial center of cap 14 to the peripheral edge 38 of protruding member 30. Relative movement of the cap 14 within the tapered groove 40 will provide a base/cap interference fit as the hooks 36 are rotated about cap edge 60 from the first end 44 to the second end 46. The respective grooves 40 are therefore rotatably fixed about peripheral edges 60 of the protruding portions 30.

In the same way adhesive 56 may be applied to the part interface formed between igniter 52 and annulus 48. Igniter 52 is then press fit within annulus 48.

The adhesive is then preferably cured by induction coil at temperatures of about 100° C. Other known cure methods at cure schedules tailored thereto may be employed, avoiding auto ignition and consistent with manufacturer recommendations.

Finally, in further accordance with the present invention, crimped fasteners may be employed about the interface of cap 14 and base 16 to enhance the strength of the housing 12 at the cap/base juncture. TOX/PRESSOTECHNIK of Chicago, Ill. may for example supply the crimped fasteners.

In yet another aspect of the present invention, a bar code 62 may be adhesively applied to the exterior of housing 12. Data such as the weight and type of propellant 26, the date of manufacture, and the material lot may be codified within the bar code thereby simplifying future identification and compliance with various safety standards. The bar code 62 can then be scanned using state-of-the-art equipment developed for that purpose. Symbol Technologies of Holtsville, N.Y., for example, provides bar code generating and scanning equipment under the trade name PDF417.

While various preferred embodiments have been described herein, one of ordinary skill will appreciate the potential to modify that described. Accordingly, the above description should not be construed to limit the present invention, but rather to describe it in its best mode as presently understood and as stated in the appended claims.

What is claimed is:

1. A gas generator comprising:
   a housing comprising a base and a cap, said cap further comprising a cap peripheral edge and said base further comprising a base peripheral edge, wherein said base peripheral edge is rotatably fixed about said cap peripheral edge;
   a plurality of protruding portions spaced along and integral with the cap peripheral edge wherein each of said plurality of protruding portions has a first radial length substantially equal to the radial lengths of the other protruding portions; and
   a plurality of hook members spaced about end integral with the base peripheral edge, each hook member corresponding to one of said plurality of protruding portions, wherein each of said plurality of hook members has a hook radial length substantially equal to the other hook members and said hook radial length is greater than said first radial length;
   a flange formed about a periphery of said cap;
   a peripheral edge formed about a periphery of said base;
   an interface formed between said base and said cap upon assembly thereof, said interface defined between said flange and said peripheral edge; and
   an adhesive composition applied within said interface upon assembly thereof for attaching said cap to said base
   wherein upon assembly of said gas generator said cap is rotatably fixed to said base by slidably engaging each of said protruding portions within a corresponding hook member thereby forming an interference fit.

2. The gas generator of claim 1 wherein said adhesive composition has a decomposition temperature less than or equal to 150° C.

3. The gas generator of claim 2 wherein said adhesive composition has a decomposition temperature from about 110° C. to 120°C.

4. The gas generator of claim 1 further comprising:
   an annulus formed centrally and radially within said cap for placement of a gas generant igniter; and
   a gas generant igniter adhesively fixed and sealed within said annulus.

5. The gas generator of claim 1 further comprising a bar code associated with said gas generator for identification of data.

* * * * *